May 16, 1944.　　　H. T. LAMBERT　　　2,348,827
VALVE CONSTRUCTION
Original Filed Oct. 31, 1941
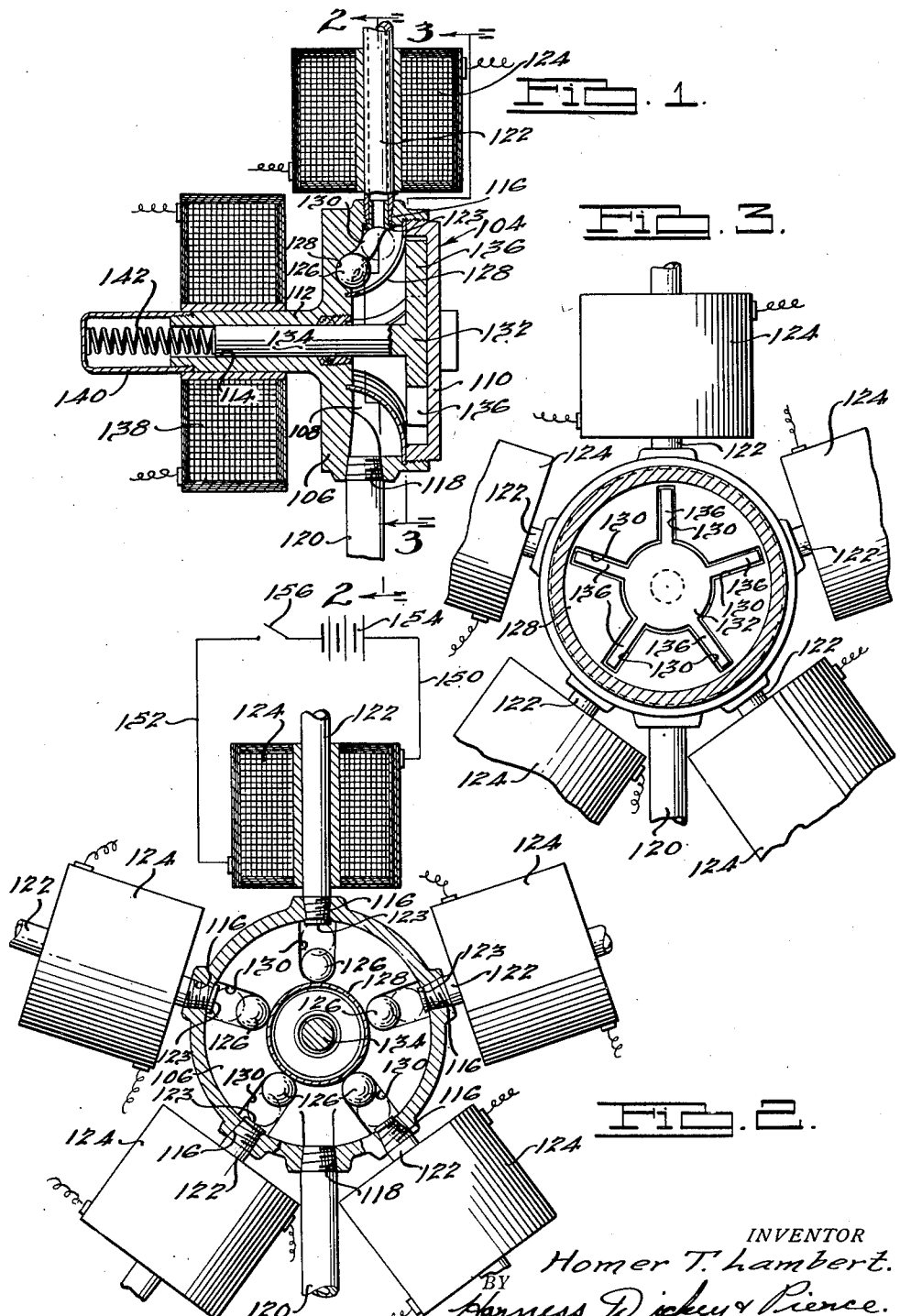
INVENTOR
Homer T. Lambert.
BY Harness, Dickey & Pierce.
ATTORNEYS.

Patented May 16, 1944

2,348,827

UNITED STATES PATENT OFFICE 2,348,827

VALVE CONSTRUCTION

Homer T. Lambert, St. Joseph, Mich., assignor to The Lambert Brake Corporation, St. Joseph, Mich., a corporation of Michigan Original application October 31, 1941, Serial No. 417,309. Divided and this application May 19, 1943, Serial No. 487,612

2 Claims. (Cl. 137—144)

The present invention relates to a valve construction and particularly relates to improvements in magnetic valve structures. The present application is a division of the co-pending application of Homer T. Lambert, Serial No. 417,309, filed October 31, 1941.

One of the primary objects of the present invention is to provide improvements in the valve structure of the type mentioned, which may be operated under high pressures, for example, up to one thousand pounds per square inch, without leakage.

Another object of the invention is to provide improvements in the valve of the type mentioned which is positive in its action in both seating and unseating the valve element.

Another object is to provide improvements in valve structure of the type mentioned in which the valve closure element is positively engaged to be unseated from its closure position.

Other objects of the invention will become apparent from the following specification, the drawing relating thereto, and from the claims hereinafter set forth.

In the drawing, in which like numerals are used to designate like parts in the several views throughout:

Figure 1 is a cross-sectional view through a valve embodying features of the present invention;

Fig. 2 is a cross-sectional view taken substantially along the line 2—2 of Fig. 1;

Fig. 3 is an elevational and cross-sectional view taken substantially along the line 3—3 of Fig. 1.

The valve of the present invention has particular utility when used in high speed industrial machines and machinery when it becomes necessary to change the flow of hydraulic pressure from one operation to another, which may be accomplished by the structure of the present invention by simply actuating an electric switch. In such use there may be a central distribution point from which there would be several high pressure lines operating many machines. The electromagnetic valves of the present type may then be used to shut off pressure from any particular line and from a remote control.

Referring to the drawing, one form of the present invention is illustrated in which a valve is generally indicated at 104, and includes a cylindrical body portion 106 formed of non-magnetic metal, such as brass, providing an annular chamber 108 and having a closure plate 110 threadably received under the open end thereof. A central stem portion 112 is formed integral with the opposite side of the body portion 104 and is provided with a central bore 114 therethrough.

The body portion 106 is provided with a plurality of radial apertures 116 at spaced intervals therearound, there being five such apertures provided in the embodiment shown, and also provided with another radial aperture 118 which is interposed between two of the apertures 116. An inlet conduit 120 is connected to the aperture 118 for introducing fluid under pressure into the interior of the valve. Such conduit 120 may be connected to a suitable source of fluid, such as oil, under pressure.

Each of the apertures 116 has a conduit member 122 connected thereto. Such conduit member 122 leads to a suitable operating mechanism. Members 122 are formed of magnetic metal, and each of such members 122 may be provided with an element 123. The elements 123 are non-magnetic, metal, tubular bushings which are relatively thin and which are pressed into the inner ends of the cores 122, so as to prevent the metal balls 126 from adhering to or sticking to their seats with respect to the cores 122. This is a safety measure in order to insure proper and positive action of the valves in that the cores 122 and the balls 126 may remain magnetized to some extent and the balls would then not release or disengage from their cores to which they are attached. With the thin portions of the non-magnetic members 123, the balls are dropped as soon as the electric current is disconnected or the circuit is broken.

The conduits 122 form the cores for electric coils 124 which embrace the cores 122 adjacent the apertures 116 so that the cores 122 will be magnetized upon energization. Such coils 124 are connected to a suitable source of electric energy. Suitable control means may be associated with each one of the cores for independently actuating such cores, or may be connected to a suitable control for automatically energizing the cores.

In order to block the flow of fluid through any one of the conduits 122 a valve element in the form of a ball 126 is provided for each one of such conduits. The balls 126 are formed from suitable magnetic metal to have the highest magnetic attraction obtainable.

The body portion 106 of the valve is preferably formed with a ball seat 128 and grooved guideway 130 adjacent each of the apertures 116 to provide a seat and guideway for the ball in its travel from its seat to a closed position over the inner end of the conduit 122. In order to keep such balls in position a cage 128 is mounted within the valve body 100 and is provided with a plurality of slots 130 therein, adjacent each of the apertures 116. The cage 128 thus provides an annular chamber so that the inlet chamber 120 is in communication with all of the conduits 122.

Thus when any of the coils 124 are energized the core 122 is magnetized to draw its corresponding ball 126 from its seat to a position over the inner end of the core 122 to block passage therethrough. The ball will remain in such position until the circuit through the particular core is broken and will then return to its seat and reopen communication through that particular conduit 122. Fluid under pressure entering from conduit 120 thus may be blocked off in its passage through any of the conduits 122.

In order to insure release of the balls from their seats against cores 122 a positive means is provided. Such means includes a member 132 which is provided with a central cylindrical portion 134 which is slidably received within the bore 114. Such member 132 is provided at the head end with a plurality of radially disposed fingers 136 which are adapted to project within the slots 130.

Another electric coil 138 embraces the tubular portion 112 of the valve and also embraces the cylindrical portion 134 of the member 132. An end cap 140 is threadably fixed to the end of the member 112 and has a coil spring 142 disposed therein which abuts against the end of the cylindrical member 134 to urge the member 132 together with the fingers 136 to its inoperative position against the end member 110. The core 134 is formed of a magnetizable material so that when the circuit is completed through coil 138 the core 134 will be drawn to the left, as viewed in Fig. 1, against the action of spring 142. The fingers 136 will then pass through the slots 130 and strike the balls 126, after such balls are on their seats against cores 122 to knock such balls away from the cores 122 into the seats 128.

As stated above, a suitable circuit may be provided for actuating the coils 124. For example, each of the coils 124 may be connected through wires 150 and 152 with a storage battery 154. A suitable switch or operating button 156 may be interposed in the circuit for completing or breaking the flow of current therethrough.

What is claimed is:

1. An electromagnetic valve comprising a valve housing having an interior chamber, means providing an inlet into said chamber, means providing a plurality of outlets from said chamber, said last-named means including a plurality of magnetizable conduit members, a ball valve element disposed in said chamber for each of said outlets, means to selectively magnetize said conduit members to attract said ball valve members, and electromagnetically actuated movable means to engage and positively release all of said ball valve members from said conduit members.

2. An electromagnetic valve comprising a valve housing having an interior chamber, means providing an inlet into said chamber, means providing a plurality of outlets from said chamber, said last-named means including a plurality of magnetizable conduit members, a ball valve element disposed in said chamber for each of said outlets, means to selectively magnetize said conduit members to attract said ball valve members, and means to positively release all of said ball valve members from said conduit members.

HOMER T. LAMBERT.